US009269308B2

(12) United States Patent
Ninan

(10) Patent No.: US 9,269,308 B2
(45) Date of Patent: Feb. 23, 2016

(54) UNIVERSAL BACK LIGHT UNIT CONTROL

(75) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 408 days.

(21) Appl. No.: 13/142,314

(22) PCT Filed: Jan. 6, 2010

(86) PCT No.: PCT/US2010/020281
§ 371 (c)(1),
(2), (4) Date: Jun. 27, 2011

(87) PCT Pub. No.: WO2010/080852
PCT Pub. Date: Jul. 15, 2010

(65) Prior Publication Data
US 2011/0267385 A1 Nov. 3, 2011

Related U.S. Application Data

(60) Provisional application No. 61/143,329, filed on Jan. 8, 2009, provisional application No. 61/238,868, filed on Sep. 1, 2009.

(51) Int. Cl.
G09G 3/36 (2006.01)
G09G 3/34 (2006.01)
H04L 12/40 (2006.01)
H04L 12/42 (2006.01)
(52) U.S. Cl.
CPC .......... *G09G 3/3426* (2013.01); *H04L 12/4015* (2013.01); *H04L 12/42* (2013.01); *G09G 3/3406* (2013.01); *G09G 2300/0426* (2013.01); *G09G 2320/041* (2013.01); *G09G 2320/0646* (2013.01); *G09G 2360/145* (2013.01); *G09G 2370/10* (2013.01)

(58) Field of Classification Search
USPC .................................................. 345/690, 102
See application file for complete search history.

(56) References Cited

U.S. PATENT DOCUMENTS

| 7,180,252 | B2 | 2/2007 | Lys |
| 7,394,210 | B2 | 7/2008 | Ashdown |
| 7,781,979 | B2* | 8/2010 | Lys ............................. 315/185 S |
| 8,120,600 | B2* | 2/2012 | Mizuta ........................... 345/204 |
| 2002/0003510 | A1* | 1/2002 | Shigetomi ....................... 345/31 |
| 2002/0067332 | A1* | 6/2002 | Hirakata et al. .............. 345/102 |
| 2005/0110960 | A1* | 5/2005 | Mao et al. ..................... 353/100 |
| 2005/0243017 | A1* | 11/2005 | Maruyama et al. ............ 345/1.1 |
| 2006/0087498 | A1* | 4/2006 | Evemy et al. ................. 345/204 |

(Continued)

FOREIGN PATENT DOCUMENTS

| EP | 1589520 | 10/2005 |
| WO | 2004094896 | 11/2004 |

(Continued)

Primary Examiner — Linh N Hoffner
(74) Attorney, Agent, or Firm — John Carpenter

(57) ABSTRACT

Display backlight units are controlled with a signal. A message has an address header specifying one of an array of backlight units, and instructions for individually controlling each of the backlight units, particularized accordingly. The message is routed from a controller to a first controllable backlight unit of the display, which controllably responds to its corresponding particularized instructions. The message is sequentially routed in order from each backlight unit to the next in a chained ring configuration. Data from the backlight units is similarly routed back to the controller.

19 Claims, 9 Drawing Sheets

100
Example Chained Ring Bus
Structure for BLU Control

(56) References Cited

U.S. PATENT DOCUMENTS

| | | | |
|---|---|---|---|
| 2006/0125771 A1* | 6/2006 | Inuzuka et al. | 345/102 |
| 2007/0182700 A1* | 8/2007 | Baba et al. | 345/102 |
| 2007/0229446 A1* | 10/2007 | Oh et al. | 345/102 |
| 2007/0236156 A1 | 10/2007 | Lys | |
| 2008/0122764 A1* | 5/2008 | Huang et al. | 345/83 |
| 2008/0136334 A1 | 6/2008 | Robinson | |
| 2008/0150880 A1* | 6/2008 | Inuzuka et al. | 345/102 |
| 2008/0204431 A1 | 8/2008 | Chung | |
| 2009/0322800 A1* | 12/2009 | Atkins | 345/690 |
| 2010/0134406 A1* | 6/2010 | Maruyama et al. | 345/102 |

FOREIGN PATENT DOCUMENTS

| | | |
|---|---|---|
| WO | 2006110286 | 10/2006 |
| WO | 2007035992 | 4/2007 |
| WO | 2007107958 | 9/2007 |
| WO | 2008052293 | 5/2008 |

* cited by examiner

Example Chained Ring Bus
Structure for BLU Control

200

Example Shared Bus Structure for BLU Control

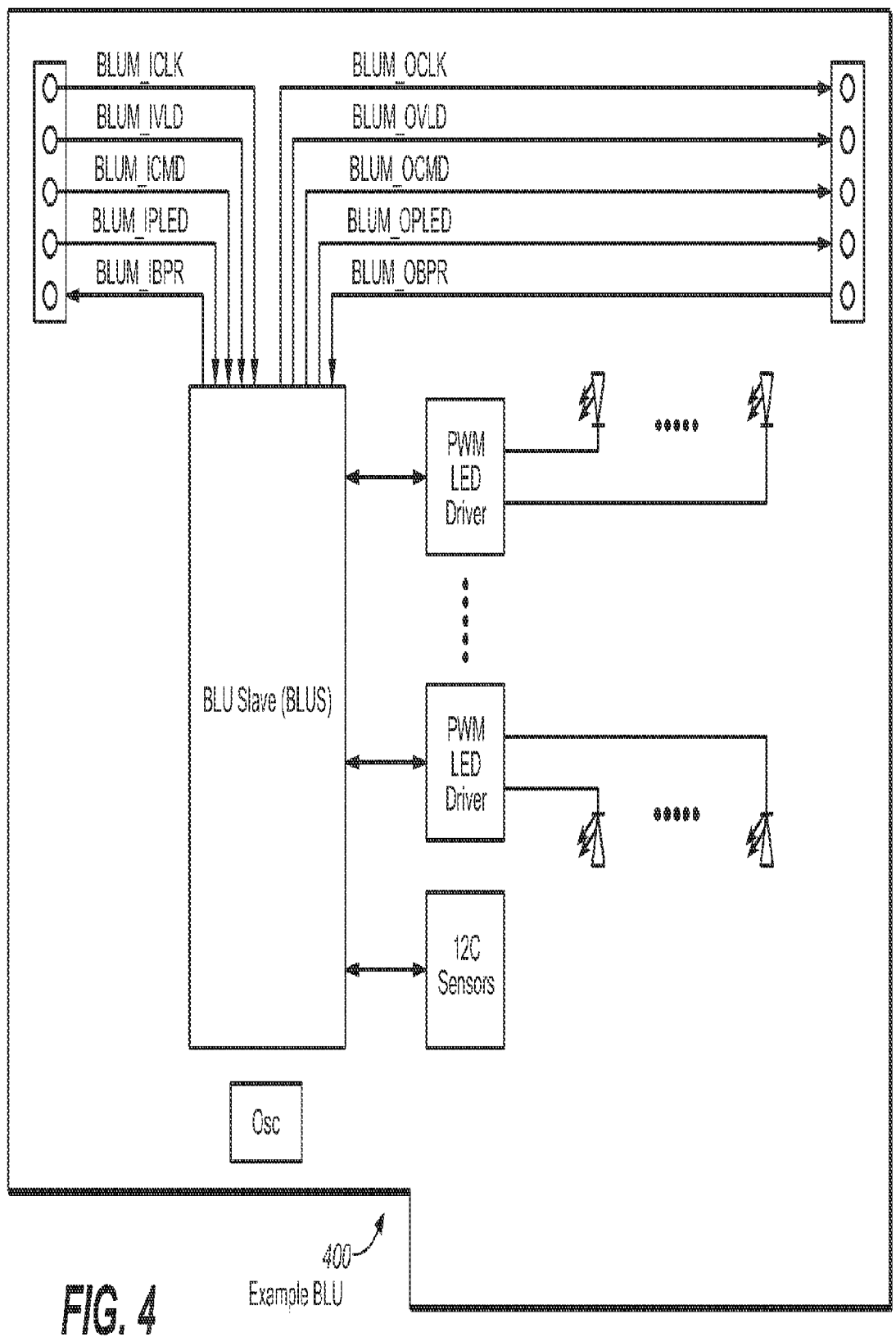
FIG. 4    400 Example BLU

UNIVERSAL BACK LIGHT UNIT CONTROL

RELATED APPLICATIONS AND PRIORITY CLAIM

This application claims priority to related U.S. Provisional Patent Applications No. 61/143,329 filed Jan. 8, 2009 and No. 61/238,868 filed Sep. 1, 2009 by Ajit Ninan, both entitled Universal Back Light Unit Control and assigned to the Assignee of the present Application (with Dolby Laboratories Reference No. D08101US01 and D08101US02), which are both incorporated herein by reference in their entirety for all purposes as if fully set forth herein.

TECHNOLOGY

The present invention relates generally to displays. More specifically, embodiments of the present invention relate to universal backlight unit control.

BACKGROUND

Liquid crystal displays (LCD) function by controlling the polarization state of display components, essentially at the pixel level. Light, typically white and emitted by a BLU source behind (from the perspective of a viewer) the LCD components, is polarized and illuminates the display components from their rear. LCD components that are in a transmissive state with respect thereto allow the polarized backlight to pass, and components that are in a non-transmissive state are correspondingly opaque.

Modern BLUs may have multiple light emitting components. For example, HDR displays may use an array of white light emitting diodes (LED). The brightness of the BLU components' emissions may be controlled to achieve acceptable HDR performance. For example, the emission intensity of one or more of the BLU components may be modulated in relation to a video input, e.g., signals that change the transmissivity state of the display components.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 depicts an example backlight unit, according to an embodiment of the present invention;

DESCRIPTION OF EXAMPLE EMBODIMENTS

Figure 1:
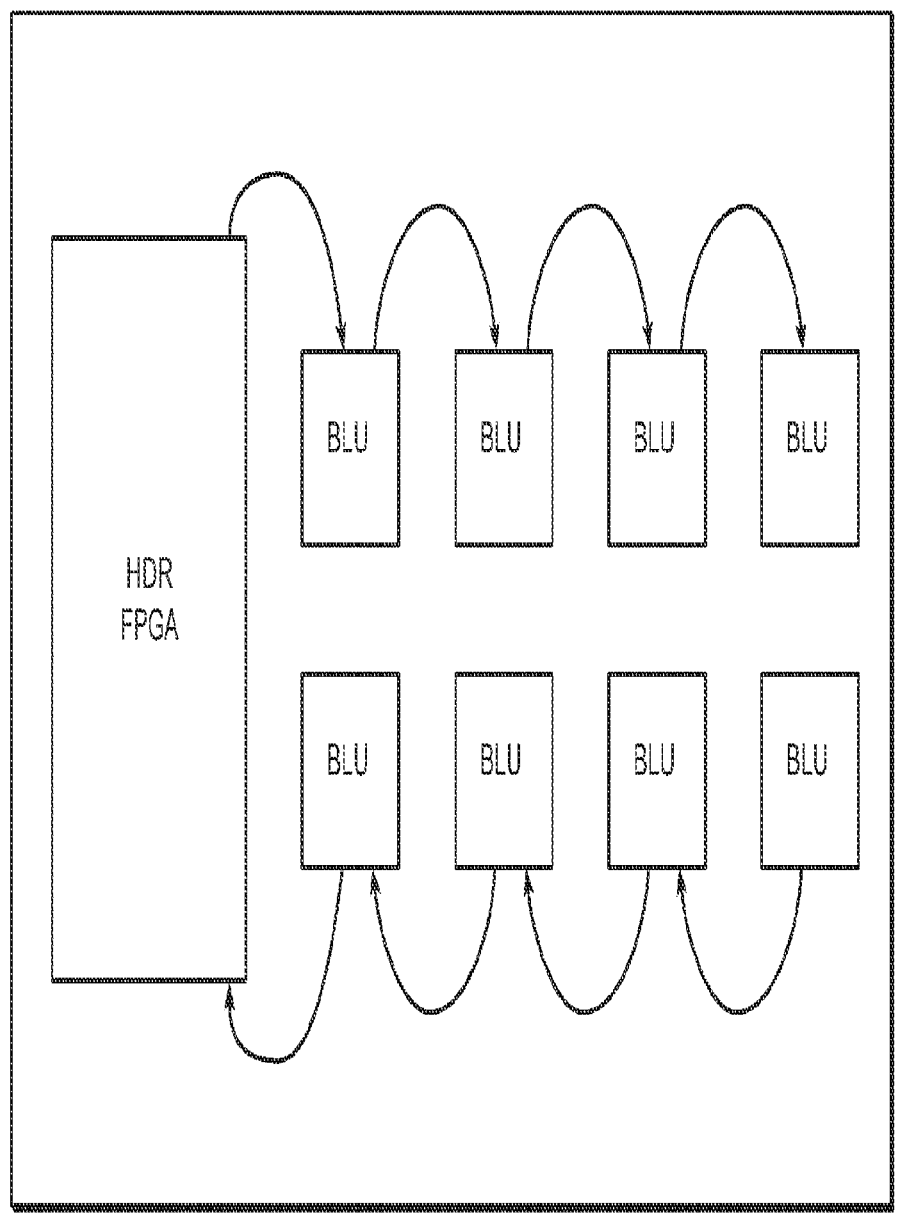
FIG. 1 depicts an example chained ring bus, according to an embodiment of the present invention.

Universal backlight unit control is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to universal backlight unit control. Display backlight units are controlled with a signal. A message has an address header specifying one of an array of backlight units, and instructions for individually controlling each of the backlight units, particularized accordingly. The message is routed from a controller to a first controllable backlight unit of the display, which controllably responds to its corresponding particularized instructions. The message is sequentially routed in order from each backlight unit to the next in a chained ring configuration. Data from the backlight units is similarly routed back to the controller In an example embodiment, an HDR controller (HDRC) is configured to include (or function with) a BLU controller (BLUC). The HDRC may be implemented with an application specific integrated circuit (ASIC) or a programmable logic device (PLD), such as a field programmable gate array (FPGA) or a high performance microcontroller. An ASIC or FPGA may, for example, be configured to include (or function with) a BLU controller (BLUC).

The BLUC controls as many BLUs as an HDR display may include. A conventional BLUC may function with a multiple bus approach, in which one BLUC (e.g., configured within one HDRC FPGA) is communicatively coupled to each of the BLUs with an individual control bus (e.g., an electrical or optical conductor), which may be coupled to an individual pin on the FPGA. In conventional approaches, individual bus components may run through an HDR TV from the BLUC of a "centrally" located HDRC component (e.g., an board mounted FPGA) to each of the BLUs, arrayed throughout the backlight structure of the TV. As display sizes rise and more BLUs are used therein, more and longer conductors and must be supplied and configured to support the conventional multiple bus approach.

An embodiment is useful in displays of any size, including large displays, which have become available and increasingly common. Although larger HDR displays typically have more BLU components, embodiments function efficiently therewith. An embodiment functions without using more pins on the HDRC/BLUC or more or longer conductors. In an embodiment, a chained ring bus architecture distributes BLU control messages (BLUM). The BLUM has address headers and data payloads that uniquely correspond to each of the BLUs in the display. In particular, the chained ring bus architecture, coupled with the BLUM control protocol, promote scalability to larger displays. Another embodiment uses a shared bus architecture to distribute the BLUM among the BLU array.

Example Backlight Unit Control Architecture and Protocol

HDR processing outputs may include two video streams: (1) a LCD video stream, which has the same resolution and refresh rate as the input; and (2) a backlight stream which is used to drive the LEDs in the BLU. The backlight stream may have a faster refresh rate and a lower resolution (maybe significantly lower). The timing relationship between the two control signal streams is programmable, e.g., to compensate for delay introduced by the LCD controller.

FIG. 1 depicts an example chained ring bus 100, according to an embodiment of the present invention. Chained ring bus 100 sends BLUM from a BLUC entity functional with the HDRC, which is depicted in FIG. 1 as an example FPGA implementation, to a first BLU. The first BLU extracts and uses the part of the BLUM directed thereto, with which the BLU is controlled. Chained ring bus 100 is depicted interconnecting eight BLUs in an example 4×2 arrangement, but should be appreciated to be extensible to virtually any number of BLUs, arrayed in a display. The first BLU then relays the BLUM to the next BLU in the ring bus chain, which extracts and uses the part of the BLUM directed thereto, with which that BLU is controlled, and then relays the BLUM to the next BLU in the ring bus chain 100. Each BLU interconnected with chained ring bus 100 extracts and uses the part of the BLUM directed thereto, with which it is controlled, and relays the BLUM to the next BLU in the ring bus chain 100.

Moreover, information that may be generated for the BLUC by one or more of the BLUs in chained ring bus 100 is passed with, or in a similar way, as the BLUM is relayed. Upon reaching the last BLU in chained ring bus 100, that BLU extracts and uses the part of the BLUM directed thereto, with which that BLU is controlled, and then relays the information that may be generated for the BLUC by it and/or one or more other BLUs "upstream" in the chained ring bus 100 to the BLUC, which functions with the HDRC. FIG. 1 depicts the BLUM as relaying in an example "clockwise" direction, from the BLUC, through each of the BLUs via chained ring bus 100, and back to the BLUC. It should be appreciated that any relaying direction may be used. In an embodiment, a second chained ring bus structure may essentially duplicate the connection pathway of chained ring bus 100, wherein the BLUM may be simultaneously or synchronously sent in an alternate (e.g., opposite) direction as the BLUM flow in chained ring bus 100, which may provide redundancy and promote reliability.

Figure 2:
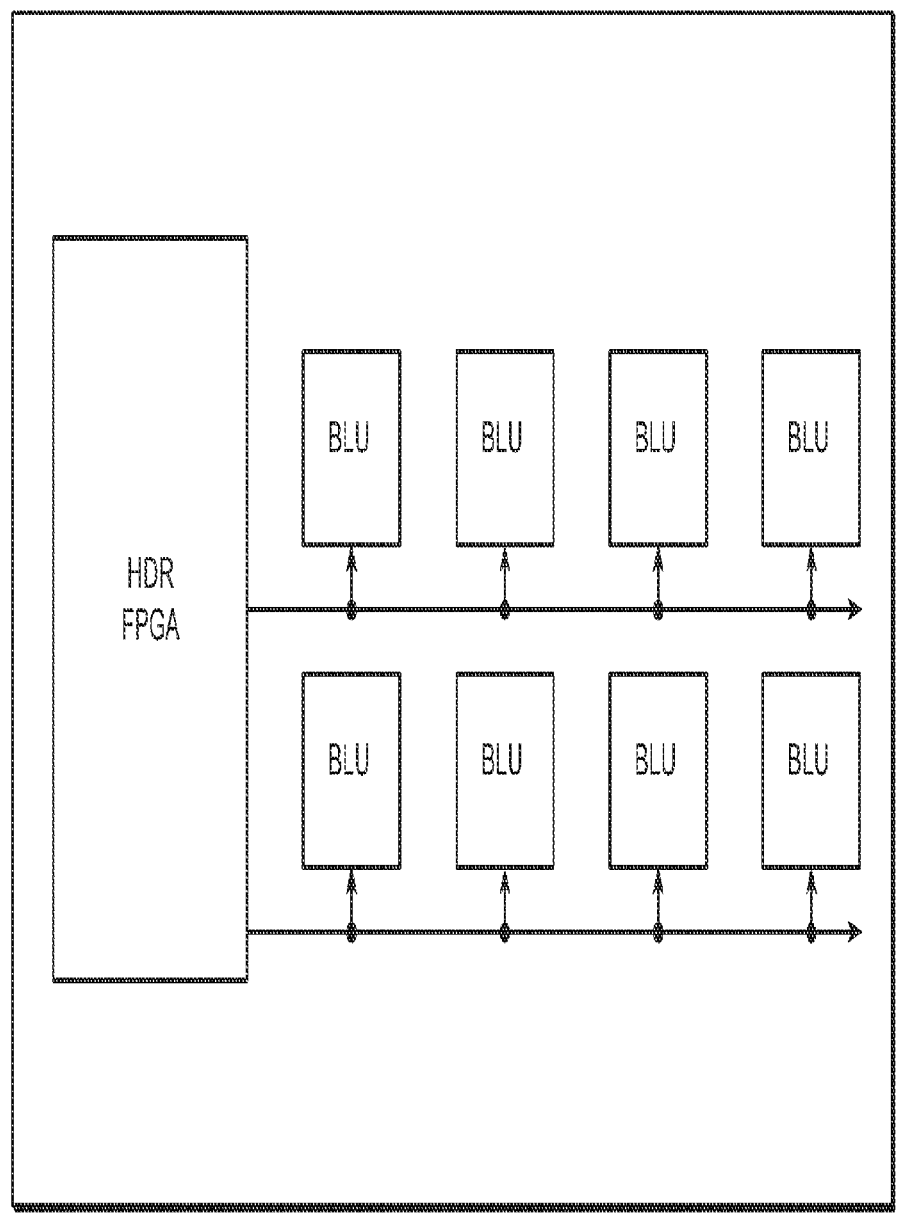
FIG. 2 depicts an example shared bus, according to an embodiment of the present invention.

FIG. 2 depicts an example shared bus structure 200, according to an embodiment of the invention. Shared bus structure 200 relays a BLUM from the BLUC over a first shared bus among a first array of BLUs, and over at least a second shared bus to at least a second array of BLUs. It should be appreciated that the first and at least second array of BLUs is extensible to relay the BLUM between virtually any number of BLUs.

Figure 3A:
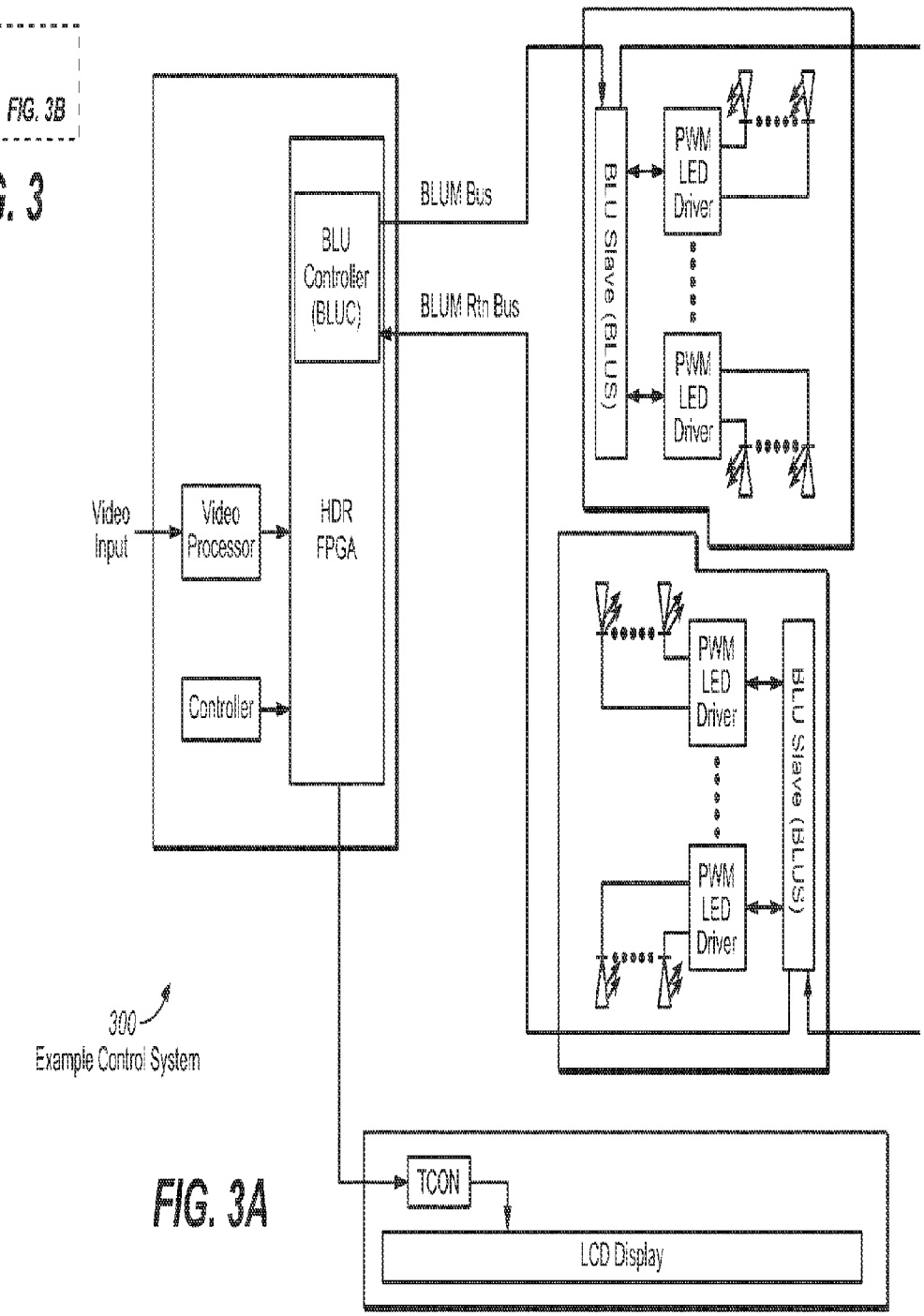
FIG. 3 depicts an example control system, according to an embodiment of the present invention.
Figure 3B:
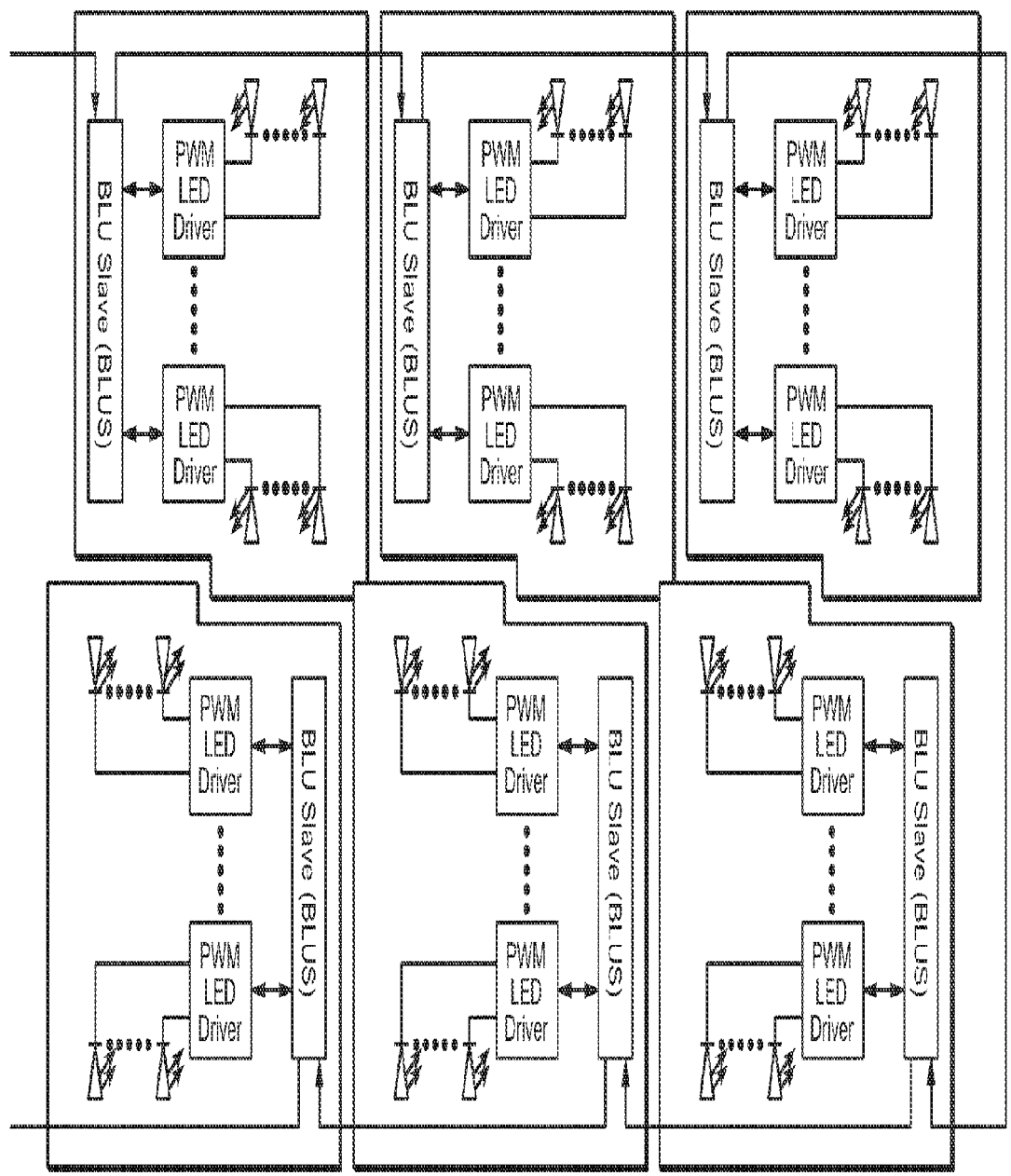

FIG. 3 depicts an example BLU control system 300, according to an embodiment of the present invention. Control system 300 receives an input of video information, such as a video stream, at a video control unit, and the video input is processed with a video processor therein. Processed video is received by an HDRC of the video control unit, which functions with a controller unit. BLU control signals corresponding to the processed video are generated by a BLUC of the HDRC, and sent in a BLUM to an input port of a BLU slave (BLUS) in the first of an array of BLUs via a BLUM bus. The BLUS extracts, translates or interprets, and uses the part of the BLUM directed thereto, with which one or more pulse width modulation (PWM) drivers are directed to control the current flow, and thus the brightness, of the LEDs of the BLU, with which the BLU is effectively controlled.

The BLUS extracts only the portion of the BLUM pertinent to that BLU, and forwards the rest of the BLUM to its egress port. The BLUS relays the BLUM through its egress port, as well as any information the BLU generates for the BLUC, over a component of a chained ring bus (e.g., chained ring bus 100; FIG. 1) to the next BLUS in the ring bus chain, which extracts and uses the part of the BLUM directed thereto, with which the PWM drivers and LEDs of that BLU are controlled, and then relays the BLUM to the next BLUS in the ring bus chain. In an embodiment, a shared bus may alternatively be used. Each BLUS interconnected with the chained ring bus extracts and uses the part of the BLUM directed thereto, with which its PWM drivers and LEDs are controlled, and relays the BLUM to the next BLU in the chain.

Upon reaching the input port of the last BLUS in the chained ring, the BLUS extracts and uses the part of the BLUM directed thereto, with which the PWM drivers and LEDs of that BLU are controlled, and then relays the information that may be generated for the BLUC by it and/or one or more other BLUs "upstream" in the chained ring bus to the BLUC. The HDRC may send corresponding modulation report and share synchronization signals with a transmissivity controller of a display, with which the display's LCD components may be controlled with enhanced HDR. While eight (8) BLUs are depicted in a 4×2 array, it should be appreciated that control system 300 is extensible to control virtually any number of BLUs, arrayed in virtually any configuration that may be interconnected with the chained ring bus (or e.g., shared busses).

FIG. 4 depicts an example BLU 400, according to an embodiment of the present invention. A BLUS receives, translates or interprets, and uses BLUM signals to control one or more PWMs, which each drive current flow to, and thus modulate the emissive brightness of, one or more LEDs. An oscillator provides timing and frequency pulses to the BLU (e.g., for synchrony with the BLUM). BLUM signals received at the ingress port of the BLUS may include an input clock ICLK, validation IVLD, commands ICMD, pixel data PLED, and an ingress backpressure signal IBPR may be sent "back" from the ingress port. BLUM signals sent from the BLUS egress port may include an output clock OCLK, validation OVLD, commands OCMD, pixel data OPLED, and an ingress backpressure signal IBPR may be received at the egress port, "back" from the ingress port of the next BLU in the chained ring. The BLUS may also have a serial interface 12C, to function with sensors, which may measure and generate information relating to temperature and optical performance (e.g., of the LEDs). Information generated for the BLUC with such devices and/or elsewhere in the BLU, may be read from therefrom and added back to (or with) the BLUM, to be relayed and thus circulated back to the HDRC.

Figure 5:
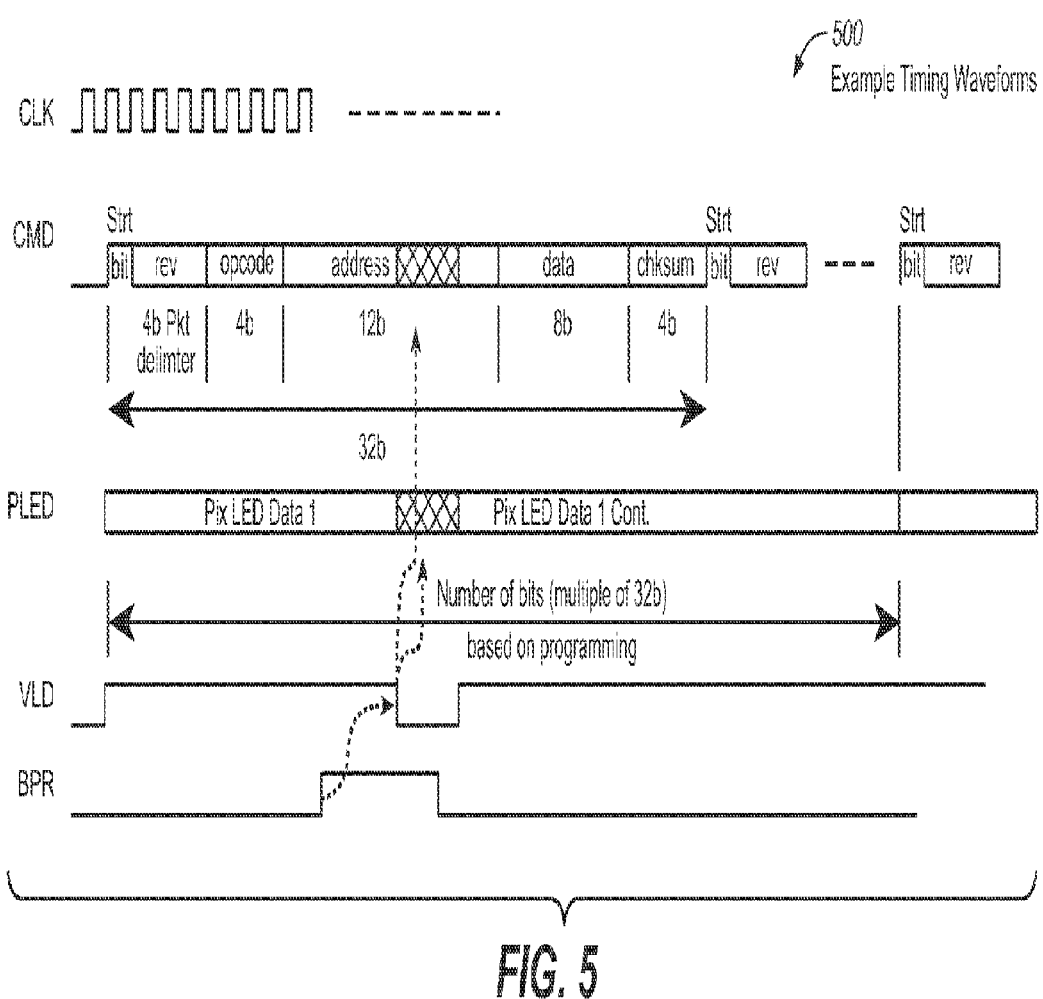
FIG. 5 depicts example timing waveforms, according to an embodiment of the present invention.

FIG. 5 depicts example timing waveforms 500, according to an embodiment of the present invention. The clock CLK is a square wave at a given frequency. In an embodiment, the waveforms conform to a BLUM protocol, which sends out a command every 32 bits. If there is nothing to send it sends a message NOP. A BLUC interface may initially provide configuration messages, reading and writing registers to set up each of the BLU boards. It may also determine BLU configurations and capabilities, and set up the BLUs to extract particular from the PixLED stream. Once configuration is complete, the HDRC may send PixLED data in segments.

These segments may be arbitrary length. In an embodiment, the segments comprise a multiple of 32; thus every new PixLED data segment beginning aligns with a command word. The first command word aligned with a PixLED data segment may be a Data Info command, which identifies the data segment for the BLUSs and that it is a beginning of a data segment. The data segment may comprise one or more rows. The BLUSs may be programmed such that each LED driver interface pulls their appropriate data from the data segments, based on the data segment ID, offset and a length. Thus, data replication for cases where multiple LED drivers are driving the same LED may be simplified, with programming same offsets and lengths. In an embodiment, a data segment may have less than completely useful data; the BLUSs extract only the needed data, and data that may be used to align the pixLED data to the command stuffing may be inserted.

A valid signal VLD signifies that the data is valid from the previous stage and the backpressure signal BPR may request a push back to the previous stage, to compensate for processing or other latency. Using these two signals, a previous BLU stage may control the data it is sending, and/or the current stage may throttle the previous stage, which may be useful where separate oscillators are used on each BLU board. Commands may relate to the example commands tabulated in Table 1, below.

TABLE 1

| | |
|---|---|
| NOP | Signifies that a header lacks useful information, and may conform to the following format: |
| Rev (3b) | 3'b000 |
| Op (4b) | 4'b0000 (x0) |
| Address | 12 bits don't care |
| 8 bit data | 8 bits don't care |
| READ | Comprises a read signal to the BLU destined for a specific board and a register in the BLU Slave Controller on that board. The BLU Slave Controller may respond with the intended data on the output path by replacing the data field with the appropriate data and changing the operational code (opcode) as seen in the READ DONE command. If the HDR gets a READ command back on the return bus, it may signify an error. The Command may conform to the following format: |
| Rev (3b) | 3'b000 |
| Op (4b) | 4'b0010 (x2) |
| Address | 5 bits of board ID, 7 bits register address |
| 8 bit data | 8'b0 on send path, data read will be sent in this slot on return path |
| READ DONE | Signifies read returned data from the read that is output on the egress port of the BLUS, generated for the HDR to receive on the return bus. The Command may conform to the following format: |
| Rev (3b) | 3'b000 |
| Op (4b) | 4'b0110 (x6) |
| Address | 5 bits of board ID, 7 bits register address |
| 8 bit data | data read |
| WRITE | Signifies a write to the BLU destined for a specific board and a register in the BLU Controller on that board. There may be no return path to confirm writes, and multiple writes may be issued. In an embodiment, for an active write to an I2C or other device, the BLUC may read for a status complete before sending the next write, which may effectively throttle the writes to that device. |
| Rev (3b) | 3'b000 |
| Op (4b) | 4'b0011 (x3) |
| Address | 5 bits of board ID, 7 bits of register address |
| 8 bit data | 8 bits write data |
| LATCH | This command may be issued with a group identifier, which is programmed at initialization in the BLUS registers associating each driver with a LATCHING group ID. Upon receiving this command, a BLUS may determine whether any of its drivers are associated with the group id sent, and may issue a latch for that driver. The Latch commands sent may be executed by the BLUS upon ensuring that any existing LED data for that driver is shifted; then the Latch command is sent to the driver. This may function as a precaution, e.g., as the BLUM chained ring bus (or shared busses) may operate at a significantly higher speed than the PWM LED drivers. The Command may conform to the following format: |
| Rev (3b) | 3'b000 |
| Op (4b) | 4'b0100 (x4) |
| Address | 12 bits 0's |
| 8 bit data | 8 bits of latching group ID |
| BLANK | This command may be issued with a group identifier, which may be programmed at initialization in the BLUS registers associating each driver with a BLANKING group ID. Upon receipt of this command, a BLUS checks to see if any of its drivers are associated with the group id sent and will issue a blank for that driver. The Command may conform to the following format: |
| Rev (3b) | 3'b000 |
| Op (4b) | 4'b1000 (x8) |
| Address | 1 bit Blank ON/OFF bit, 3 bits 0's, lower 8 bits being the blanking group ID |
| 8 bit data | 8 bits of 0's |
| LATCH & BLANK | This may comprise a combination of the above two commands. The Command may conform to the following format: |
| Rev (3b) | 3'b000 |
| Op (4b) | 4'b1100 (xC) |
| Address | 1 bit Blank ON/OFF bit, 3 bits 0's, lower 8 bits being the blanking group ID |
| 8 bit data | 8 bits of latching group ID |
| DATA INFO | This may be issued at the beginning of multiple, e.g., every data segment/row. Data on the pixLED data line may correspond more or less directly to this information. This information allows tracking, e.g., where pixLED data appears in an image. Each BLUS identifies which data segment/line pertinent thereto, and extracts this information to shift to its PWM LED drivers. A BLUS may be programmed at start up as to which data line it should be looking for and which bits to copy into its shift register. Each BLUS may be responsible for multiple row/lines and for a certain column of that data, which may be describe by Data ID, offset and length. This allows efficient data replication with setting the same values for each of the individual LED drive values in the PWM shift register. Replication may be used, as a single LED may be driven by multiple individual LED drive pins, e.g., for additional drive strength. Repetition of this command may be limited, to deter starving other commands. In an implementation, there may be six or more commands each |

TABLE 1-continued

Data Info command, which implicitly allows 192 bits times the minimum distance between one data info command and the next, and that the data segments/group of rows may be sent as a multiple of 32 bit slots. Not all of the bits may need to be used as pixLED data by the BLUS, but the BLUC may stuff the slots to achieve this spacing. The Command may conform to the following format:
Rev (3b)           3'b000
Op(4b)             4'b1010 (xA)
Address            12 bits of Data ID
8 bit data         8 bits of 0's
RESET BLU          This command resets the BLU after forwarding this reset command. After reset the initialization negotiations may begin again. The Command may conform to the following format:
Rev (3b)           3'b000
Op(4b)             4'b1111 (xF)
Address            12 bits of 0's
8 bit data         8 bits of 0's
AUTO BOARD ID      This comprises an initializing command that sets up the board IDs in the BLUS. Each of the BLUSs respond with a Auto board id command and the board id in the top bits of the address field. The Command may conform to the following format:
Rev (3b)           3'b000
Op(4b)             4'b0001 (x1)
Address            12 bits of 0's
8 bit data         8 bits (the HDR sends 8'b0 while the subsequent BLUS increment this field)
PIXLED Check Sum   This command may be set at any time to have the BLUSs check their running check sum on the PixLED bus. The check sum that it is compared to comprises the check sum accumulated to the last data segment checksum, which is stored in a register. The current checksum is calculated and at the end of the data segment is added to the existing check sum. Any errors may be logged in the BLUS register. Once this check sum is sent, it may also mean a reset to the accumulating last checksum. The Command may conform to the following format:
Rev (3b)           3'b000
Op(4b)             4'b1001 (x9)
Address            12 bits of 0's
8 bit data         8 bits of pixLED checksum
INTERRUPT          This command signifies that there is an interrupt from a specific board, which it may insert with replacement of the NOPs in the stream. Thus, at least one NOP is present in each data segment. Interrupt commands may be generated upon an erroneous checksum detection. The Command may conform to the following format:
Rev (3b)           3'b000
Op (4b)            4'b0111 (x1)
Address            5 bit board id, 7 bits 0's
8 bit data         8 bits of status Additionally or alternatively, commands may relate to the example commands tabulated in Table 2, below.

TABLE 2

NOP:               Signifies that the header has lacks useful information. The Command may conform to the following format:
Rev (3b)           3'b000
Op (4b)            4'b0000 (x0)
Address            12 bits don't care
8 bit data         8 bits don't care
READ:              Comprises a read to the BLU destined for a specific board and a register in the BLU Slave Controller on that board. The BLU Slave Controller may respond with the intended data on the output path with replacement of the data field with the appropriate data and changing the operational code, e.g., as seen in the READ DONE command, below in Table 2. An error may be signified with HDR getting a READ command back on the return bus. The Command may conform to the following format:
Rev (3b)           3'b000
Op (4b)            4'b0010 (x2)
Address            5 bits of board ID, 7 bits register address
8 bit data         8'b0 on send path, data read will be sent in this slot on return path
READ DONE:         Comprises the read-returned data from the read that comprises an output, on the output of the BLU Slave, which the HDR will get on the return bus. The Command may conform to the following format:
Rev (3b)           3'b000
Op (4b)            4'b0110 (x6)
Address            5 bits of board ID, 7 bits register address
8 bit data         data read
WRITE:             Comprises a write to the BLU destined for a specific board and a register in the BLU Controller on that board. No return path need be configured to confirm writes, and multiple writes may be issued. For an active write to some devices, e.g., an I2C device, the TABLE 2-continued HDR BLU Controller may read for a status complete, prior to sending the next write to throttle the writes to that device. The Command may conform to the following format:

Rev (3b)        3'b000
Op (4b)        4'b0011 (x3)
Address        5 bits of board ID, 7 bits of register address
8 bit data        8 bits write data LATCH: This command may be issued with a group identifier (ID), which may be programmed at initialization in the BLUS registers associating each driver with a LATCHING group ID. Upon receipt of the LATCH command, the BLUS may check whether any of its drivers are associated with the group identifier sent, and may issue a latch for that driver. The Latch commands sent may be executed by the BLUS upon determining whether existing LED data for that driver has been shifted; the Latch command is sent to the driver. This may be helpful where high speed Drivers (e.g., operating near 30 Mhz) are outpaced with a faster operating BLUM. The Command may conform to the following format:

Rev (3b)        3'b000
Op (4b)        4'b0100 (x4)
Address        12 bits 0's
8 bit data        8 bits of latching group ID BLANK: This command may be issued with a group identifier, which may be programmed at initialization in the BLUS registers associating each driver with a BLANKING group ID. Upon receipt of this command, a BLUS may check to determine whether any of its drivers are associated with the group identifier sent, and may issue a blank for that driver. The Command may conform to the following format:

Rev (3b)        3'b000
Op (4b)        4'b1000 (x8)
Address        1 bit Blank ON/OFF bit, 3 bits 0's, lower 8 bits being the blanking group ID
8 bit data        8 bits of 0's LATCH & BLANK: May comprise a useful or efficient combination of the two commands 'LATCH' and 'BLANK', immediately above in Table 2. The Command may conform to the following format:

Rev (3b)        3'b000
Op (4b)        4'b1100 (xC)
Address        1 bit Blank ON/OFF bit, 3 bits 0's, lower 8 bits being the blanking group ID 8
bit data        8 bit data 8 bits of latching group ID DATA INFO: May be issued at the beginning of one or more, e.g., every data segment or row. The data on the pixled data line may relate or correspond to this information. The information may be useful for tracking where, e.g., graphically or spatially within an image, the 'pixled' data is located. Each BLU Slave may identify which data segment or line it will use, and extracts the corresponding information, e.g., to shift to its driver.
The BLUS may be programmed at start up in relation to which data line it may seek and which bits to copy, e.g., into its shift register. Each BLUS may handle multiple row/lines and for a certain column of that data, which may be described by 'Data ID', offset and length. Data may thus be efficiently replicated with setting the same values for each of the individual LED drive values in a shift register associated with pulse width modulation (PWM). Replication may increase diode driving strength where, for example, a single LED is driven with multiple individual LED drive pins.
To conserve bandwidth and other resources for other commands during operations, the period between individual DATA INFO may be staggered, scheduled, rationed, or delayed. An embodiment may be implemented wherein at least six other commands are handled between each Data Info command. For example, this may relate to 192 bits comprising a minimum distance between each data info command. Data segments/group of rows may be sent as a multiple of 32 bits slots. Not every bit need be used as pixled data by the BLUS, but a BLUC may stuff bits to achieve this economy. The Command may conform to the following format:

Rev (3b)        3'b000
Op (4b)        4'b1010 (xA)
Address        12 bits of Data ID
8 bit data :        8 bits of 0's RESET BLU: Resets the BLU, upon forwarding itself. Upon a reset, initialization negotiations may reconvene. The Command may conform to the following format:

Rev (3b)        3'b000
Op (4b)        4'b1111 (xF)
Address        12 bits of 0's
8 bit data        8 bits of 0's AUTO BOARD ID: Comprises an initializing command, which sets up the board identifiers in the BLUS. Each of the BLUSs may respond with an Auto board id command that has a board identifier in the top bits of its address field. The Command may conform to the following format:

Rev (3b)        3'b000
Op (4b)        4'b0001 (x1)
Address        12 bits of 0's
8 bit data        8 bits (the HDR sends 8'b0 while the subsequent BLUS increment this field)

PIXLED Check Sum: This command may be set at any time to have the slaves check their running check sum on the Pixled bus. The checked running check sum is compared to the check sum accumulated to the last data segment checksum, which is stored in a register. The current checksum is calculated and, at the end of the data segment, may be added to the TABLE 2-continued existing check sum. Errors may be logged to a Slave register. Once this check sum is sent, the accumulating last checksum is reset. The Command may conform to the following format:
Rev (3b)            3'b000
Op (4b)             4'b1001 (x9)
Address             12 bits of 0's
8 bit data          8 bits of pixled checksum
INTERRUPT:          This command may signify that there is an interrupt from a specific board. Boards may insert these interrupts with replacement of NOPs in the stream. Thus, at least one NOP is useful in all data segments. The Command may conform to the following format:
Rev (3b)            3'b000
Op (4b)             4'b0111 (x1)
Address             5 bit board id, 7 bits 0's
8 bit data          8 bits of status A priority order for which commands are sent on the BLUM bus may be in the reverse order of what has been shown above. For example, the command NOP has the lowest priority, with increasing priority through the Interrupt command, which may have the highest priority. Upon a reset or power-up, the HDRC may begin with sending NOPs. The BLUs may be in an idle state, waiting to be synchronized. During this idle time, start bits or NOPs may not be sent. As each BLU powers on into the idle state, it will look for NOPs on its incoming bus and move to a locked state. In the locked state, the BLUS sends on its output interface its NOPs, which effectively awaken its neighboring BLUSs.

Upon the BLUC receiving NOPs on its return path BLUM, the HDRC becomes aware that the chained ring bus is established. The locked ring then has its board identifiers programmed; thus the HDRC/BLUC sends a Board ID command, which traverses the chain programming the BLUs with their identities in the chain, incrementing the identifiers as it traverses around, until the return path ID identifies the board population in the chain.

Figure 6A:
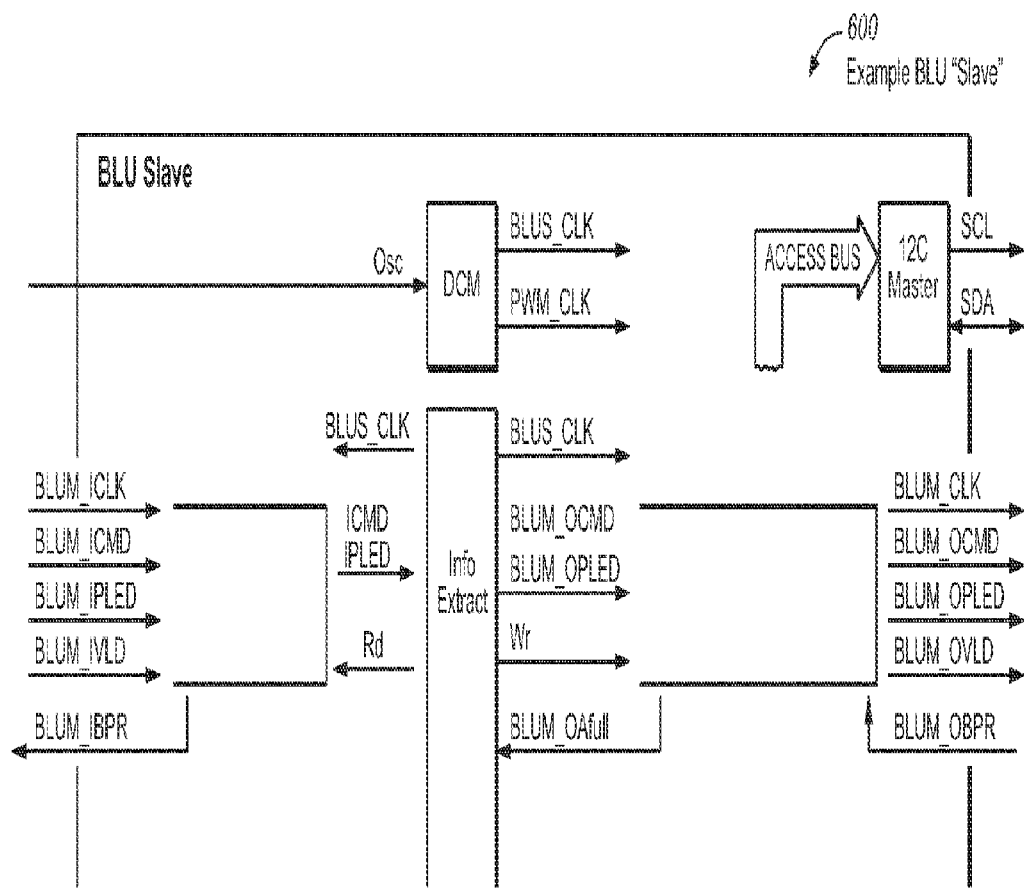
FIG. 6 depicts an example BLUS, according to an embodiment of the present invention.
Figure 6B:
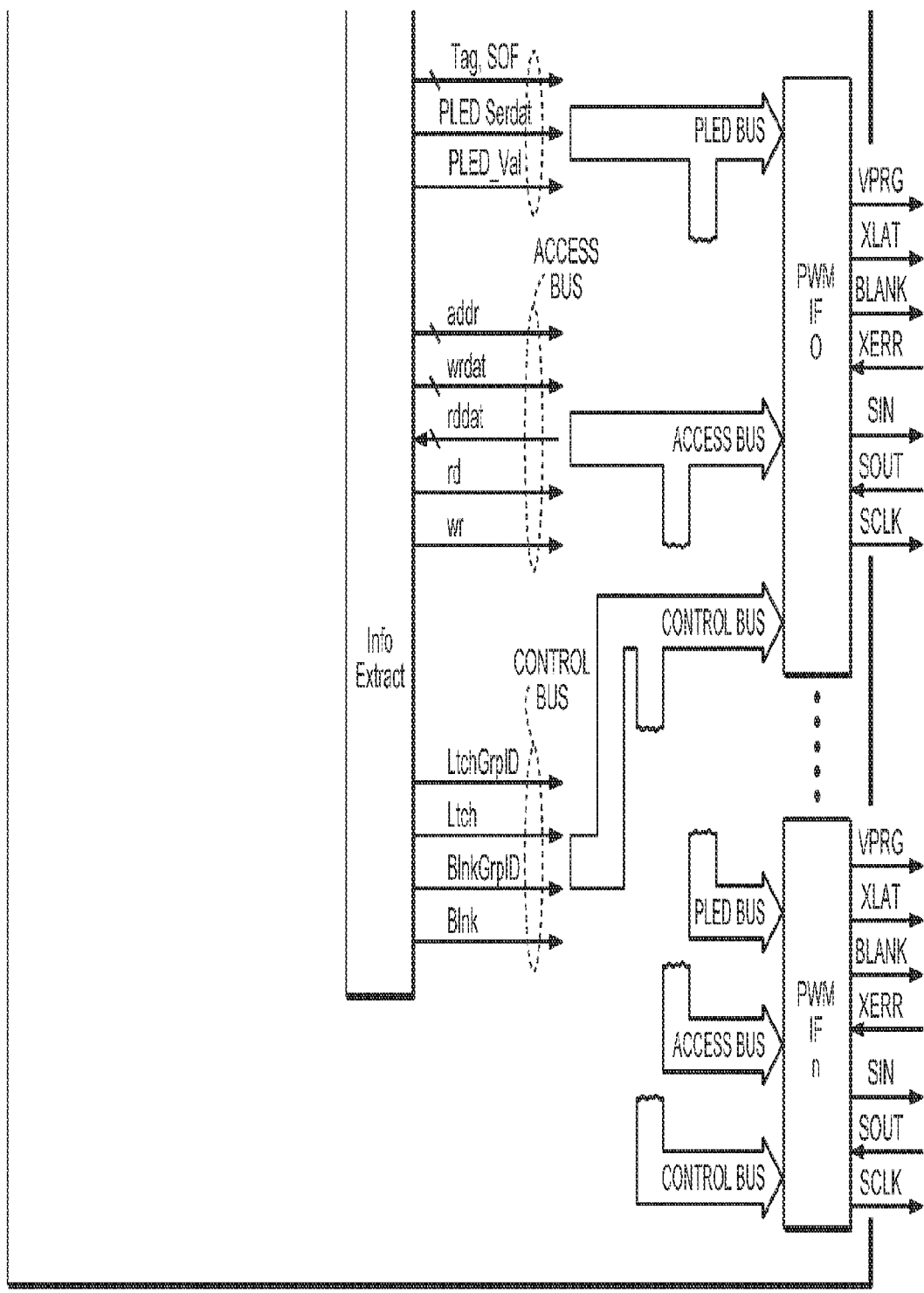
Figure 7:
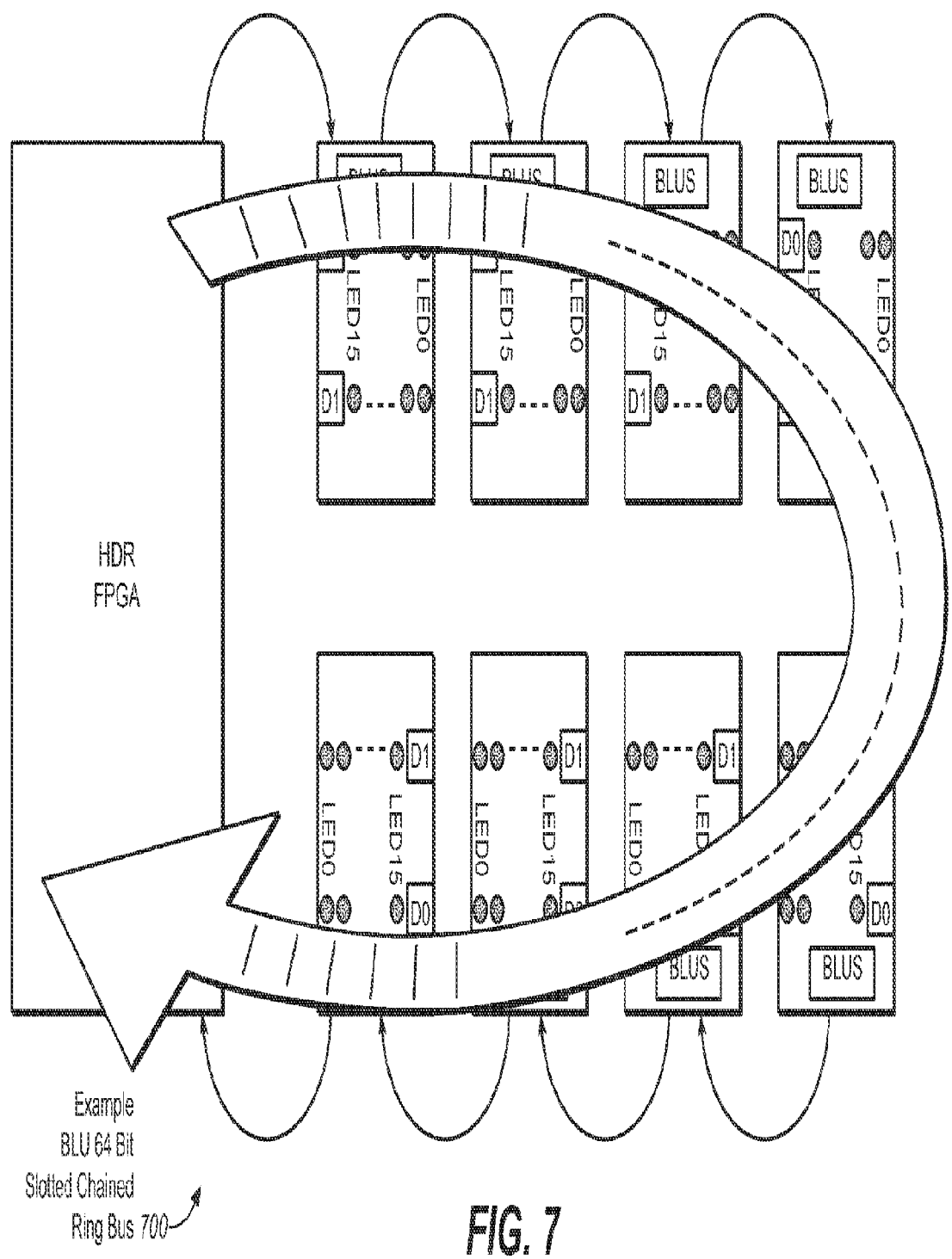
FIG. 7 depicts an example slotted ring, according to an embodiment of the present invention.

FIG. 6 depicts an example BLUS 600, according to an embodiment of the present invention. FIG. 7 depicts an example BLU 64 bit slotted ring 700, according to an embodiment of the present invention.

In an embodiment, a BLU Messaging (BLUM) protocol is used to transmit control signals from the BLUC and other information from the BLUC to each of the BLUs. Each BLU has multiple panels of LEDs; each individually set to provide a controlled back light that extends the dynamic range of the LCD. For example, eight BLU panels may be connected by the chained ring bus in a 4×2 configuration. Each panel has a BLU Slave (BLUS) device, which (1) translates the BLUM, (2) extracts the appropriate information for its board, and (3) forwards the BLUM signal stream via the chained ring bus to the next BLUS in the array.

A send BLUM bus links each BLU board to the next in the ring, which chains the bus around the boards with a return BLUM bus back to the HDRC. Each BLUS device receives incoming data on an ingress connector bus and extracts information off the BLUM bus and uses it if it deems it pertinent to that BLUS. The rest of the message is forwarded to its Egress connector. The BLUM packets have an address header, with which the BLUS determines the pertinence of data within the packet payload to its associated BLU. Reliability may be added using a redundant chained ring bus, e.g., routed in a configuration counter to that of another chained ring bus, each of which may carry redundant data, e.g., for use in mission critical display applications (e.g., nuclear power plant control rooms, aircraft cockpits, aviation and maritime navigation and surveillance, etc.). The chained ring busses are extensible to provide reliable control over any number of BLUs. Thus, they promote scalability to any size display.

An embodiment of the present invention may relate to one or more of the example embodiments enumerated below.

1. A method, comprising the steps of:
   generating a signal to control a plurality of backlight units that are arrayed in a display;
   wherein the backlight unit control signal comprises a message that has:
      an address header that specifies one of the backlight units in the array; and
      a data payload that has instructions for individually controlling each of the backlight units, wherein the instructions are particularized for the individual backlight units according to the address header;
   routing the backlight unit control signal from a controller to a first controllable backlight unit of the display, wherein the first backlight unit controllably responds to the corresponding particularized instructions according to the address header; and
   routing the backlight unit control signal from the first controllable backlight unit to at least a second controllable backlight unit of the display, wherein the at least second backlight unit controllably responds to the corresponding particularized instructions according to the address header.

2. The method as recited in Enumerated Example Embodiment 1 wherein the display comprises a positive integer 'N' of backlight units, wherein N is greater than or equal to two (2); and
   wherein the method further comprises the step of:
   routing the backlight unit control signal from the controllable backlight unit that has an ordinality within the array, which corresponds to the positive integer (N−1), in relation to the controllable backlight unit of the display that corresponds to the positive integer N, wherein the Nth backlight unit controllably responds to the corresponding particularized instructions according to the address header.

3. The method as recited in Enumerated Example Embodiment 2 wherein, upon one or more of the backlight units that has an ordinality within the array of less than or equal to (N−1) generating information for the controller, the method further comprises the steps of:
   routing the information from the generating backlight unit via backlight units of each successive ordinality through (N−1) to the Nth backlight unit; and
   routing the information from the Nth backlight unit to the controller; and
   wherein, upon the Nth backlight unit generating information for the controller, the method further comprises the step of:

routing the information from the Nth backlight unit to the controller.

4. The method as recited in Enumerated Example Embodiment 1 wherein the routing steps comprise sending the backlight unit control signals over components of a conductive bus structure.

5. The method as recited in Enumerated Example Embodiment 4 wherein the conductive bus structure comprises a chained ring bus architecture.

6. The method as recited in Enumerated Example Embodiment 4 wherein the conductive bus structure comprises at least one of a serially or paralleled shared bus structure.

7. The method as recited in Enumerated Example Embodiment 4 wherein the bus structure is electrically or optically conductive.

8. The method as recited in Enumerated Example Embodiment 4 wherein the routing steps comprise sending the backlight unit control signals over components of a first conductive bus structure and a second conductive bus structure;
   wherein first conductive bus structure routes the backlight unit control signals in a first direction;
   wherein the second conductive bus structure routes the backlight unit control signals in a direction that is independent of the first direction.

9. The method as recited in Enumerated Example Embodiment 1 wherein the backlight unit control signal comprises a signal that modulates a level of brightness for light emitted with one or more components of the backlight unit.

10. The method as recited in Enumerated Example Embodiment 1 wherein the backlight unit component emission brightness level is modulated in relation to a video signal.

11. The method as recited in Enumerated Example Embodiment 1 wherein the video signal controls a transmissivity state of one or more components of the display.

12. The method as recited in Enumerated Example Embodiment 1 wherein the backlight unit control signal functions to effectively extend the dynamic range of the display.

13. The method as recited in Enumerated Example Embodiment 1 wherein the display comprises a liquid crystal display.

14. A circuit configured to perform one or more steps of methods as recited in one or more of Enumerated Example Embodiments 1-13.

15. The circuit as recited in Enumerated Example Embodiment 14, comprising:
   a plurality of controllable backlight units; and
   a controller that functions to control the backlight units; and
   the conductive bus structure as recited in one or more of Enumerated Example Embodiments 4-8, wherein the controller and the plurality of controllable backlight units are communicatively coupled therewith.

16. An apparatus configured to perform one or more steps of methods as recited in one or more of Enumerated Example Embodiments 1-13.

17. The apparatus as recited in Enumerated Example Embodiment 16, comprising the circuit as recited in one or more of Enumerated Example Embodiments 14-15.

18. A system, comprising:
   means for generating a signal to control a plurality of backlight units that are arrayed in a display;
   wherein the backlight unit control signal comprises a message that has:
      an address header that specifies one of the backlight units in the array; and
      a data payload that has instructions for individually controlling each of the backlight units, wherein the instructions are particularized for the individual backlight units according to the address header;
   means for routing the backlight unit control signal from a controller to a first controllable backlight unit of the display, wherein the first backlight unit controllably responds to the corresponding particularized instructions according to the address header; and
   means for routing the backlight unit control signal from the first controllable backlight unit to at least a second controllable backlight unit of the display, wherein the at least second backlight unit controllably responds to the corresponding particularized instructions according to the address header.

19. The system as recited in Enumerated Example Embodiment 18, further comprising:
   means for performing a process as recited in one or more of Enumerated Example Embodiments 2-13.

20. A use for a computer system, comprising performing a process as recited in one or more of Enumerated Example Embodiments 1-13.

21. A computer readable storage medium that stores encoded instructions, which when executed with one or more processors, cause the processors to:
   perform one or more of the method steps as recited in one or more of Enumerated Example Embodiments 1-13; or
   program, control or configure:
      one or more components of the circuits recited in one or more of Enumerated Example Embodiments 14-15;
      an apparatus as recited in one or more of Enumerated Example Embodiments 16-17;
      a system as recited in one or more of Enumerated Example Embodiments 18-19; or
      a computer system, used as recited in Enumerated Example Embodiment 20.

Equivalents, Extensions, Alternatives and Miscellaneous

Example embodiments of universal backlight unit control are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising the steps of:
   receiving an input video stream by a display device, the display device comprising a plurality of backlight units and a modulator, wherein the plurality of backlight units are configured to provide a backlighting for the modulator;
   generating a modulator video stream, derived from the input video stream, that has substantially the same resolution as the input video stream;
   generating a plurality of signals, derived from the input video stream, to control the plurality of backlight units, the plurality of signals including a command signal and a pixel data signal that are sent over different lines of a conductive bus structure;
      wherein the command signal comprises a message that has an address header that specifies one of the backlight units in the array, and a data payload that has instructions for individually controlling each of the backlight units, wherein the instructions are particularized for the individual backlight units according to the address header;

wherein the pixel data signal serves to modulate a level of brightness for light emitted with a plurality of individually controllable components of each backlight unit;

routing the command signal and the pixel data signal from a controller to a first controllable backlight unit of the display, wherein the first backlight unit controllably responds to the corresponding particularized instructions according to the address header, and wherein the first backlight unit extracts, from the pixel data signal, appropriate data needed to control the plurality of individually controllable components of the first backlight unit;

routing the command signal and the pixel data signal from the first controllable backlight unit to at least a second controllable backlight unit of the display, wherein the at least second backlight unit controllably responds to the corresponding particularized instructions according to the address header, and wherein the second backlight unit extracts, from the pixel data signal, appropriate data needed to control the plurality of individually controllable components of the second backlight unit; and wherein the lighting units provide a backlighting for the modulator, the backlighting being of a low resolution than the video displayed by the modulator.

2. The method as recited in claim 1 wherein the pixel data signal comprises segments of pixel data, wherein the segments of pixel data are aligned with command words sent in the command signal.

3. The method as recited in claim 2 wherein the first command word aligned with a pixel data segment identifies the pixel data segment for the backlight units.

4. The method as recited in claim 3 wherein each backlight unit pulls its appropriate data from the data segments, based on a data segment identifier, an offset, and a length.

5. The method as recited in claim 3 wherein each backlight unit comprises a plurality of LED drivers and extracts data from the data segments, based on a data segment identifier, an offset, and a length, and shifts the extracted data to its LED drivers.

6. The method as recited in claim 1 wherein the display comprises a positive integer 'N' of backlight units, wherein N is greater than or equal to two (2); and wherein the method further comprises the step of:
routing the command signal and the pixel data signal from the controllable backlight unit that has an ordinality within the array, which corresponds to the positive integer (N−1), in relation to the controllable backlight unit of the display that corresponds to the positive integer N, wherein the Nth backlight unit controllably responds to the corresponding particularized instructions according to the address header.

7. The method as recited in claim 6 wherein, upon one or more of the backlight units that has an ordinality within the array of less than or equal to (N−1) generating information for the controller, the method further comprises the steps of:
routing the information from the generating backlight unit via backlight units of each successive ordinality through (N−1) to the Nth backlight unit; and
routing the information from the Nth backlight unit to the controller; and wherein, upon the Nth backlight unit generating information for the controller, the method further comprises the step of:
routing the information from the Nth backlight unit to the controller.

8. The method as recited in claim 1 wherein the conductive bus structure comprises a chained ring bus architecture.

9. The method as recited in claim 1 wherein the conductive bus structure comprises at least one of a serially or paralleled shared bus structure.

10. The method as recited in claim 1 wherein the bus structure is electrically or optically conductive.

11. The method as recited in claim 1 wherein the routing steps comprise sending the command and pixel data signals over components of a first conductive bus structure and a second conductive bus structure;
wherein first conductive bus structure routes the command and pixel data signals in a first direction;
wherein the second conductive bus structure routes the command and pixel data signals in a direction that is independent of the first direction.

12. The method as recited in claim 1 wherein the backlight unit component emission brightness level is modulated in relation to a video signal.

13. The method as recited in claim 12 wherein the video signal controls a transmissivity state of one or more components of the display.

14. The method as recited in claim 1 wherein the command and pixel data signals function to effectively extend the dynamic range of the display.

15. The method as recited in claim 1 wherein the display comprises a liquid crystal display.

16. A circuit, comprising:
a signal generator that receives an input video stream for a display device, the display device comprising a plurality of backlight units and a modulator, wherein the plurality of backlight units are configured to provide a backlighting for the modulator; generates a modulator video stream, derived from the input video stream, that has substantially the same resolution as the input video stream and generates a plurality of signals, derived from the input video stream, to control a plurality of backlight units that are arrayed in a display, wherein the display comprises a single output for projection or display of images, the plurality of signals including a command signal and a pixel data signal that are sent over different lines of a conductive bus structure;

wherein the command signal comprises a message that has an address header that specifies one of the backlight units in the array, and a data payload that has instructions for individually controlling each of the backlight units, wherein the instructions are particularized for the individual backlight units according to the address header;

wherein the pixel data signal serves to modulate a level of brightness for light emitted with a plurality of individually controllable components of each backlight unit;

a command signal router that routes the command signal and the pixel data signal:
from a controller to a first controllable backlight unit of the display, wherein the first backlight unit controllably responds to the corresponding particularized instructions according to the address header, and wherein the first backlight unit extracts, from the pixel data signal, appropriate data needed to control the plurality of individually controllable components of the first backlight unit; and from the first controllable backlight unit to at least a second controllable backlight unit of the display, wherein the at least second backlight unit controllably responds to the corresponding particularized instructions according to the address header, and wherein the second backlight unit extracts, from the pixel data signal, appropriate data needed to control the plurality of individually controllable components of the second backlight unit.

17. The circuit as recited in claim 16, further comprising:
the plurality of controllable backlight units; and
a controller that functions to control the backlight units; and
the conductive bus structure, wherein the controller and the plurality of controllable backlight units are communicatively coupled therewith.

18. An apparatus, comprising:
a signal generator that receives an input video stream for a display device, the display device comprising a plurality of backlight units and a modulator, wherein the plurality of backlight units are configured to provide a backlighting for the modulator; generates a modulator video stream, derived from the input video stream, that has substantially the same resolution as the input video stream and generates a plurality of signals, derived from the input video stream, to control a plurality of backlight units that are arrayed in a display, wherein the display comprises a single output for projection or display of images, the plurality of signals including a command signal and a pixel data signal that are sent over different lines of a conductive bus structure;
wherein the command signal comprises a message that has an address header that specifies one of the backlight units in the array, and a data payload that has instructions for individually controlling each of the backlight units, wherein the instructions are particularized for the individual backlight units according to the address header;
wherein the pixel data signal serves to modulate a level of brightness for light emitted with a plurality of individually controllable components of each backlight unit;
a command signal router that routes the command signal and the pixel data signal: from a controller to a first controllable backlight unit of the display, wherein the first backlight unit controllably responds to the corresponding particularized instructions according to the address header, and wherein the first backlight unit extracts, from the pixel data signal, appropriate data needed to control the plurality of individually controllable components of the first backlight unit; and from the first controllable backlight unit to at least a second controllable backlight unit of the display, wherein the at least second backlight unit controllably responds to the corresponding particularized instructions according to the address header, and wherein the second backlight unit extracts, from the pixel data signal, appropriate data needed to control the plurality of individually controllable components of the second backlight unit.

19. A system, comprising:
a plurality of backlight units;
a modulator, the modulator receiving backlighting from the plurality of backlight units;
a controller, the controller configured to receive an input video stream;
means for generating a modulator video stream, derived from the input video stream
means for generating a plurality of signals, derived from the input video stream, to control a plurality of backlight units that are arrayed in a display, wherein the display comprises a single output for projection or display of images, the plurality of signals including a command signal and a pixel data signal that are sent over different lines of a conductive bus structure;
wherein the command signal comprises a message that has an address header that specifies one of the backlight units in the array, and a data payload that has instructions for individually controlling each of the backlight units, wherein the instructions are particularized for the individual backlight units according to the address header;
wherein the pixel data signal serves to modulate a level of brightness for light emitted with a plurality of individually controllable components of each backlight unit;
means for routing the command signal and the pixel data signal from a controller to a first controllable backlight unit of the display, wherein the first backlight unit controllably responds to the corresponding particularized instructions according to the address header, and wherein the first backlight unit extracts, from the pixel data signal, appropriate data needed to control the plurality of individually controllable components of the first backlight unit; and
means for routing the command signal and the pixel data signal from the first controllable backlight unit to at least a second controllable backlight unit of the display, wherein the at least second backlight unit controllably responds to the corresponding particularized instructions according to the address header, and wherein the second backlight unit extracts, from the pixel data signal, appropriate data needed to control the plurality of individually controllable components of the second backlight unit.

* * * * *